US012646490B2

(12) United States Patent
O'Sullivan

(10) Patent No.: US 12,646,490 B2
(45) Date of Patent: Jun. 2, 2026

(54) CUSTOM FITTING STRINGED INSTRUMENT PICK

(71) Applicant: Daniel O'Sullivan, Sugar Land, TX (US)

(72) Inventor: Daniel O'Sullivan, Sugar Land, TX (US)

( * ) Notice: Subject to any disclaimer, the term of this patent is extended or adjusted under 35 U.S.C. 154(b) by 0 days.

(21) Appl. No.: 17/178,956

(22) Filed: Feb. 18, 2021

(65) Prior Publication Data

US 2021/0304711 A1 Sep. 30, 2021

Related U.S. Application Data

(60) Provisional application No. 63/002,587, filed on Mar. 31, 2020.

(51) Int. Cl.
*G10D 3/173* (2020.01)
*E06B 9/303* (2006.01)
*E06B 9/32* (2006.01)

(52) U.S. Cl.
CPC ............. *G10D 3/173* (2020.02); *E06B 9/303* (2013.01); *E06B 9/32* (2013.01)

(58) Field of Classification Search
CPC ............ G10D 3/173; G10D 3/00; G10D 1/00; G10D 1/04
See application file for complete search history.

(56) References Cited

U.S. PATENT DOCUMENTS 4,015,502 A * 4/1977 Strong .................. G10D 3/173 84/322
6,335,477 B1 * 1/2002 Miller .................. G10D 3/173 84/322

* cited by examiner

*Primary Examiner* — Kimberly R Lockett

(57) ABSTRACT

The Custom Fitting Stringed Instrument Pick (pick) provides a fast, comfortable, and effective way to mimic the natural fingernails many musicians cannot maintain in order to pluck the strings of a musical instrument as desired and on a regular basis. Said pick also provides a novel means to secure to a finger or thumb of the musician's hand. Instead of the traditional means of securing, the present invention snugly wraps around said finger or thumb and gently presses simultaneously downwards from the nail side of the digit and upwards from the fleshy underside of the digit tip. This not only allows said pick to be tightly secured to the digit but distributes the pressure on the digit in an even way. It also allows for inter-digit tactical feel that provides feedback to the player over time and permits easier execution of fast and difficult musical passages. Said pick is also capable of being custom fit to suit the contours, geometry, and size of a player's fingers and thumb.

3 Claims, 4 Drawing Sheets

CUSTOM FITTING STRINGED INSTRUMENT PICK

Inventor directly claims the benefit under 35 U.S.C. 119(e) and 37 CFR 1.78 of a prior provisional application No. 63/002,587, confirmation code 8693 on this invention filed on Mar. 31, 2020 and titled Privacy Adapter For Venetian Blinds and Custom Fitting Stringed Instrument Pick.

BACKGROUND OF THE INVENTION

This invention pertains to guitar and other stringed musical instruments. Traditional picks are awkward to use and do not provide a good fit on the finger or thumb. Additionally, they are generally not easily customizable for fit on the players fingers and thumb.

BRIEF SUMMARY OF THE INVENTION

The Custom Fitting Stringed Instrument Pick provides a fast, comfortable and effective way to mimic the natural fingernails so many musicians cannot maintain in order to pluck the strings of a musical instrument.

DETAILED DESCRIPTION OF THE INVENTION

Figure 1:
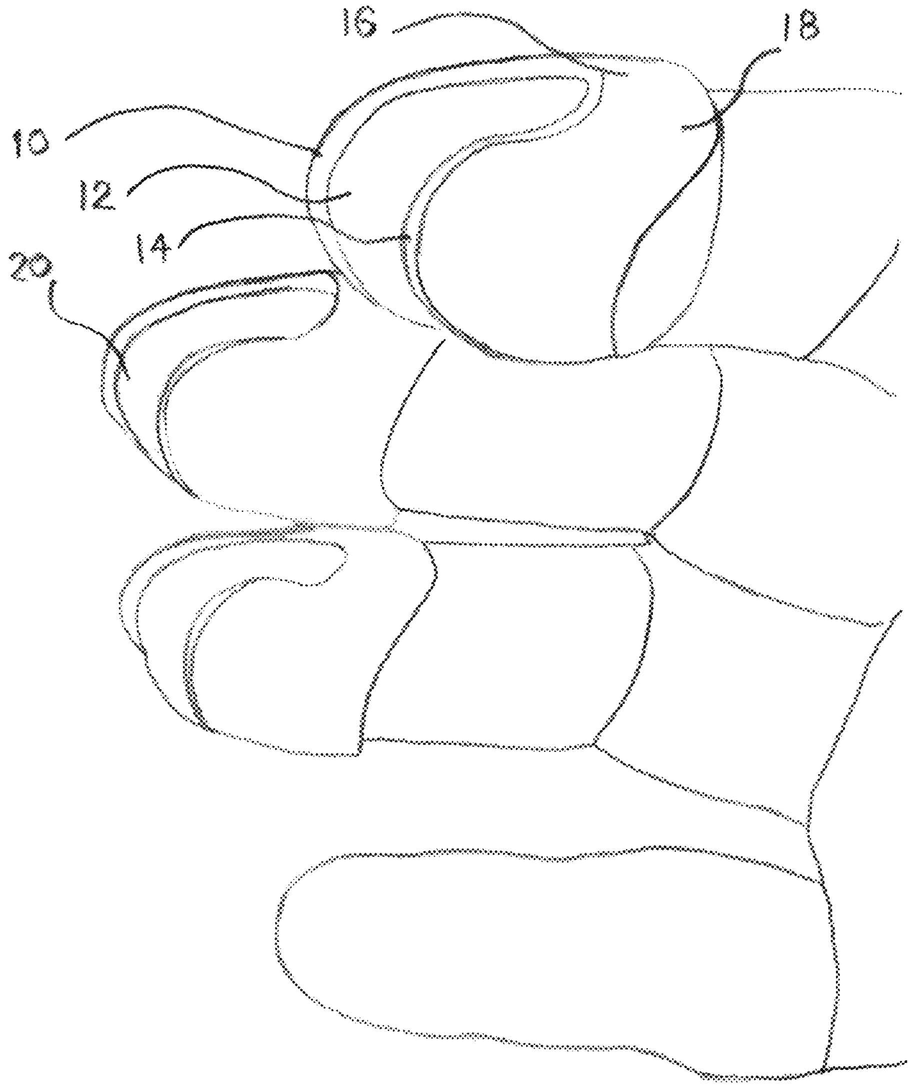
FIG. 1 shows an isometric view of one embodiment of the present invention.
Figure 2:
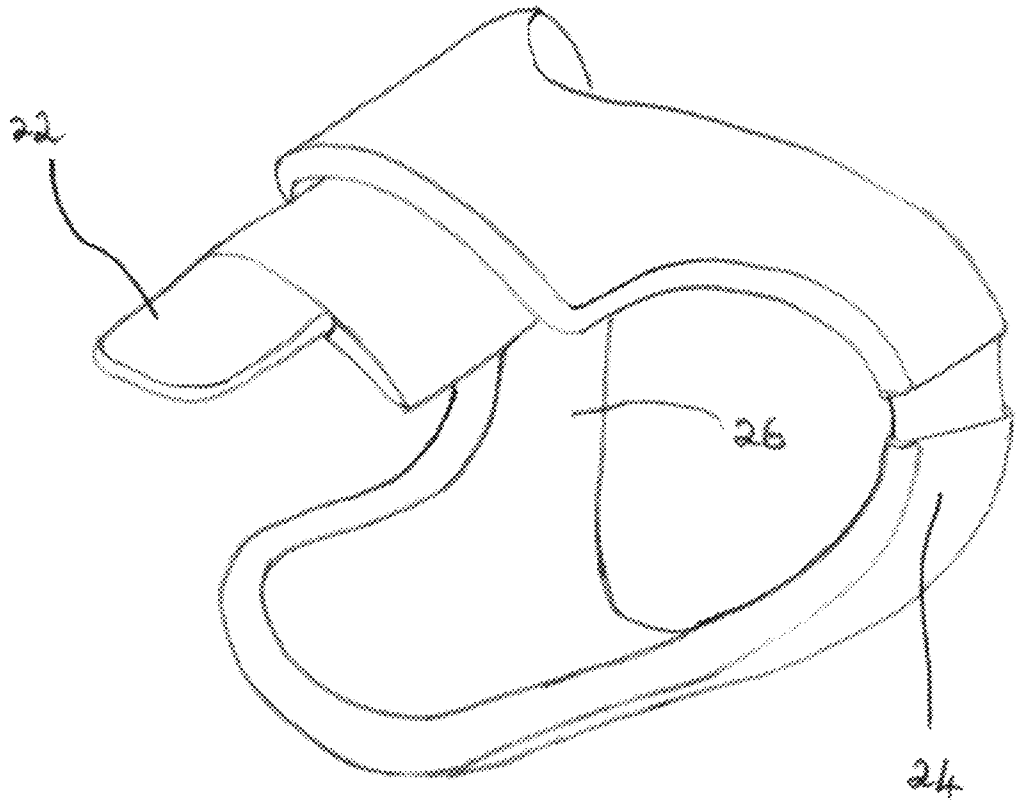
FIG. 2 shows an isometric view of another embodiment of the present invention.
Figure 3:
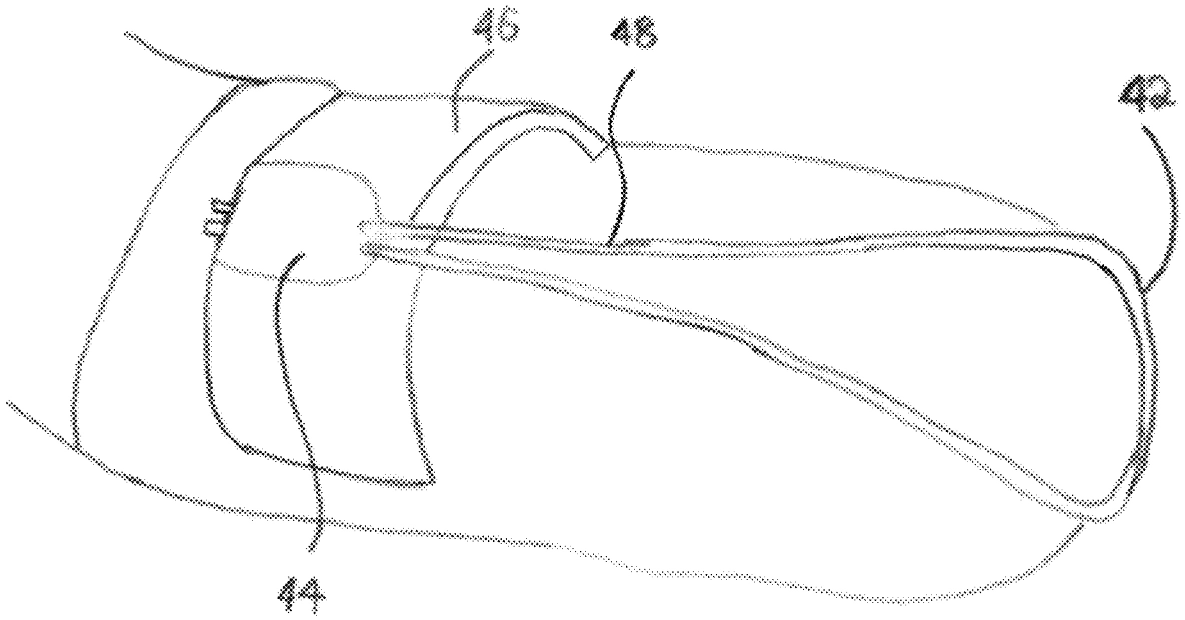
FIG. 3 shows an isometric view of another embodiment of the present invention.
Figure 4:
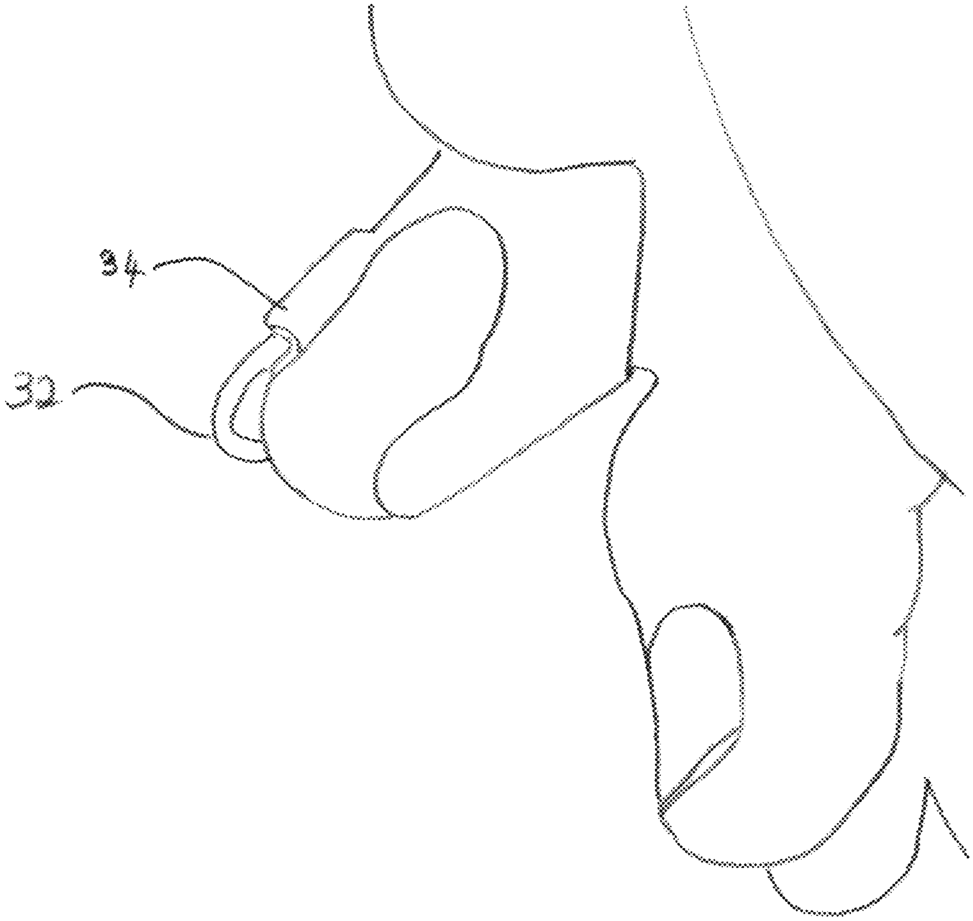
FIG. 4 shows an isometric view of another embodiment of the present invention.

A principal feature of the invention is to provide comfort and ease of playing, while allowing a user customizable finger or thumb fit. Also key to the invention is the ability to provide great tone from the guitar or stringed instrument, while also keeping the Custom Fitting Stringed Instrument Pick light in weight and constructed in such a way as to maximize the grip and friction to keep same secured well to the finger or thumb. also key to the present invention is to prevent the pick from being so thick and cumbersome when worn, that the picks on adjacent fingers interfere with each other mechanically by rubbing up against each other when finger picking the instrument. Also key to the design is to easily allow both up and down strokes on an individual digit basis while playing the instrument.

While the principal features of the present invention are described herein, it is understood that variations of the invention can be made by those skilled in the art without departing from the spirit of the invention.

I claim:

1. A fitted stringed instrument pick comprising: an opening in a lower part of said pick, said pick rests snugly on or around a fingerprint pad of a finger or thumb and is secured thereto by means of an element pressing against the top of a fingernail or a fleshy area of said finger or thumb; said pick surrounding said fingernail; wherein a gauge material forms a rim around the top of said finger or thumb and protrudes in order to allow plucking of the string; wherein said rim consists of a wire formed in said rim to permit bending to accommodate contouring of said finger; and wherein said wire can be attached or detached to the rim via holes formed in said rim.

2. The fitted stringed instrument pick as described in claim 1 wherein a small gauge material forms a rim close to and approximately around said top of said finger or thumb and protrudes in order to allow plucking of the string in a manner that emulates a natural fingernail.

3. The fitted stringed instrument pick as described in claim 2 wherein an additional protrusion exists on said rim to allow said protrusion to be used to pluck said string.

* * * * *